(12) United States Patent
Liu

(10) Patent No.: US 8,511,197 B2
(45) Date of Patent: Aug. 20, 2013

(54) ROBOT ARM ASSEMBLY

(75) Inventor: Zhen-Xing Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 496 days.

(21) Appl. No.: 12/872,204

(22) Filed: Aug. 31, 2010

(65) Prior Publication Data

US 2011/0154935 A1 Jun. 30, 2011

(30) Foreign Application Priority Data

Dec. 30, 2009 (CN) .......................... 2009 1 0312665

(51) Int. Cl.
*B25J 17/00* (2006.01)
*B25J 17/02* (2006.01)
*B25J 18/00* (2006.01)

(52) U.S. Cl.
USPC .................................... 74/490.04; 74/490.05

(58) Field of Classification Search
USPC ............... 74/490.01, 490.03, 490.04, 490.05, 74/490.06
See application file for complete search history.

(56) References Cited

U.S. PATENT DOCUMENTS

| 4,732,526 | A | * | 3/1988 | Nakashima et al. | .......... | 414/730 |
| 4,922,755 | A | * | 5/1990 | Oshiro et al. | .............. | 74/490.03 |
| 5,934,148 | A | * | 8/1999 | Haniya et al. | .............. | 74/490.06 |
| 7,806,020 | B2 | * | 10/2010 | Forslund et al. | .......... | 74/490.06 |

FOREIGN PATENT DOCUMENTS

| CN | 2465893 Y | 12/2001 |
| CN | 1832830 A | 9/2006 |

\* cited by examiner

*Primary Examiner* — Justin Krause
(74) *Attorney, Agent, or Firm* — Altis Law Group, Inc.

(57) ABSTRACT

A robot arm assembly includes a support arm, a lower arm rotatably connected to the support arm, an upper arm rotatably connected to the lower arm, a first driver for driving the lower arm, a first transmission transferring power from the first driver to the lower arm, a second driver for driving the upper arm, and a second transmission transferring power from the second driver to the upper arm. The first and second drivers are mounted on the support arm. The second transmission includes a belt assembly, a beveled gear assembly driven by the belt assembly, and a speed reducer coupled to the upper arm.

13 Claims, 4 Drawing Sheets

ROBOT ARM ASSEMBLY

BACKGROUND

1. Technical Field

The present disclosure generally relates to robotic technologies, and particularly, to a robot arm assembly.

2. Description of Related Art

A commonly used robot arm assembly includes a plurality of rotating members connected in series. An end effector, such as a welding device, a gripper, or a cutting tool, is mounted at a distal arm of the robot to execute specific tasks. Generally six axes are utilized to achieve maximum movement and positioning of the end effector.

In robots of this kind, each arm rotates around a rotation axis driven by a driving unit. Typically, the driving unit includes a motor mounted on the lower arm and a speed reducer coupled to the motor to transmit the movement of the motor to the upper arm. The speed reducer may be a high gear ratio gear, such as a harmonic gear reducer, a RV reducer (rotary vector reducer), or a planetary reducer. The motor and the speed reducer are arranged along the rotation axis of the arm, rendering the range along the rotation axis relatively large. In a six-axis industrial robot, the second arm is rotatably connected to the third arm and may be perpendicular thereto. The second and third arms are respectively driven by two driving units adjacent to each other, such that the combined second and third arms are relatively large. As a result, the industrial robot needs considerable space to operate freely and safely. In addition, the cables connected to the motors for transmitting signals and power are carried within the robot, with possible abrasion between the cables and the components of the robot.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
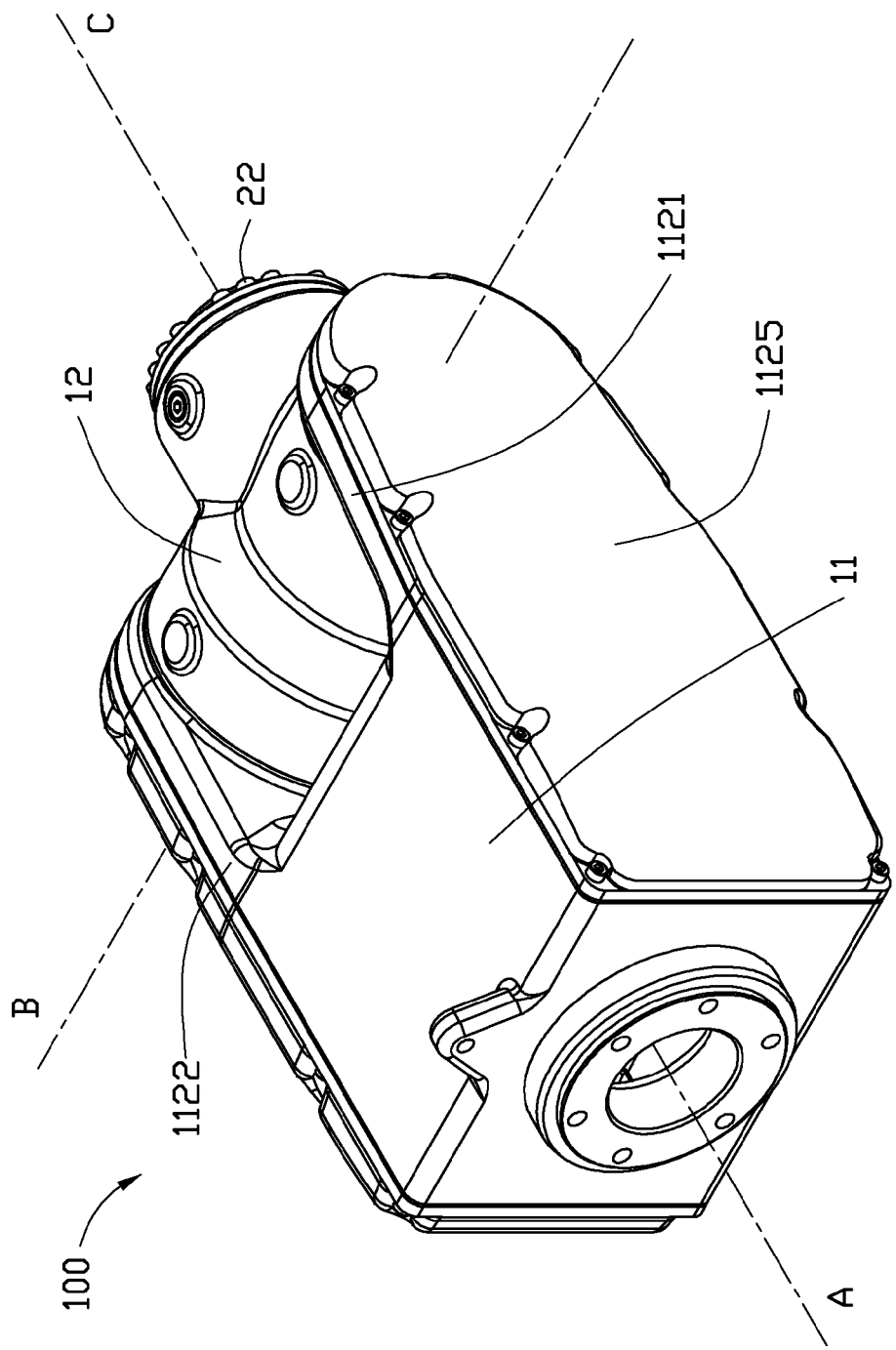
FIG. 1 is an isometric view of one embodiment of a robot arm assembly used with a six-axis robot.
Figure 2:
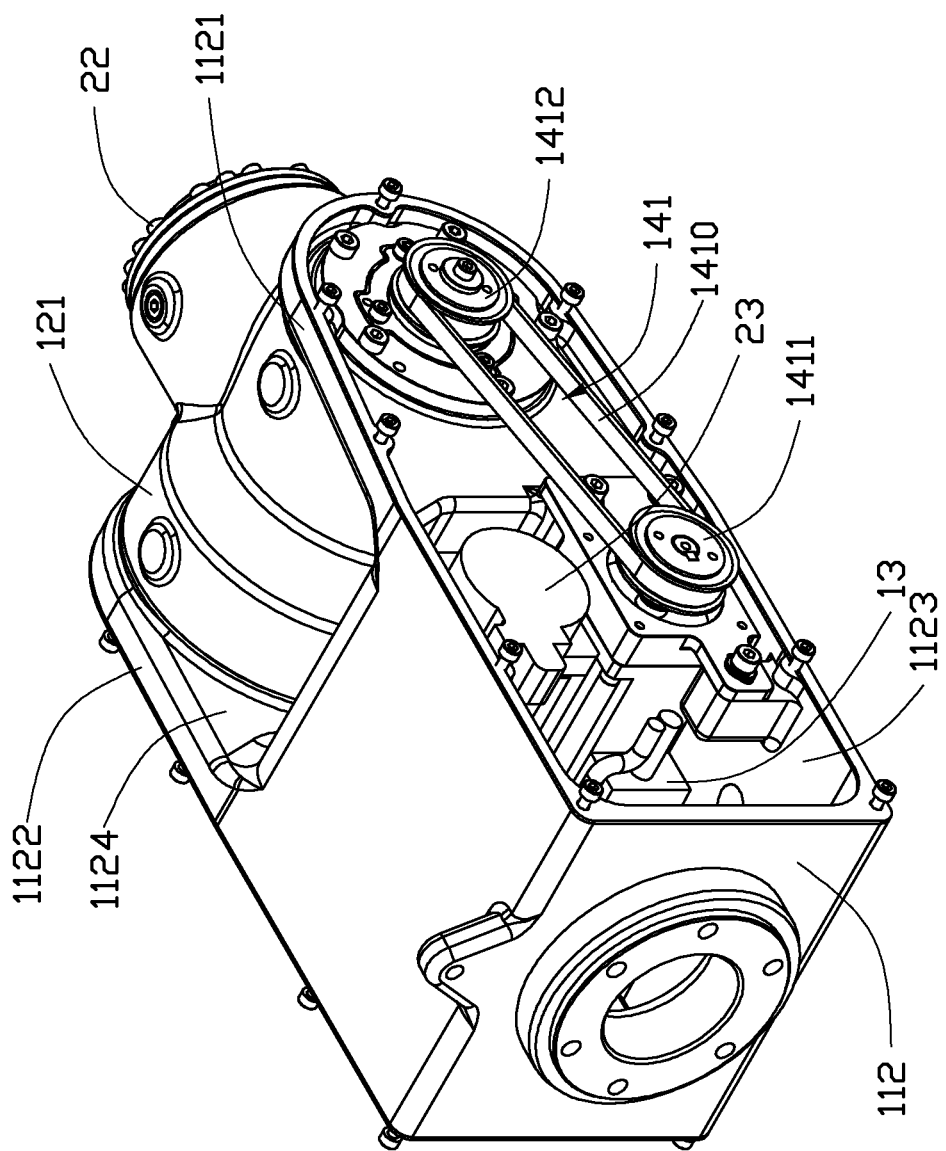
FIG. 2 is a partially isometric view of the robot arm assembly of the FIG. 1 omitting a first housing thereof.
Figure 3:
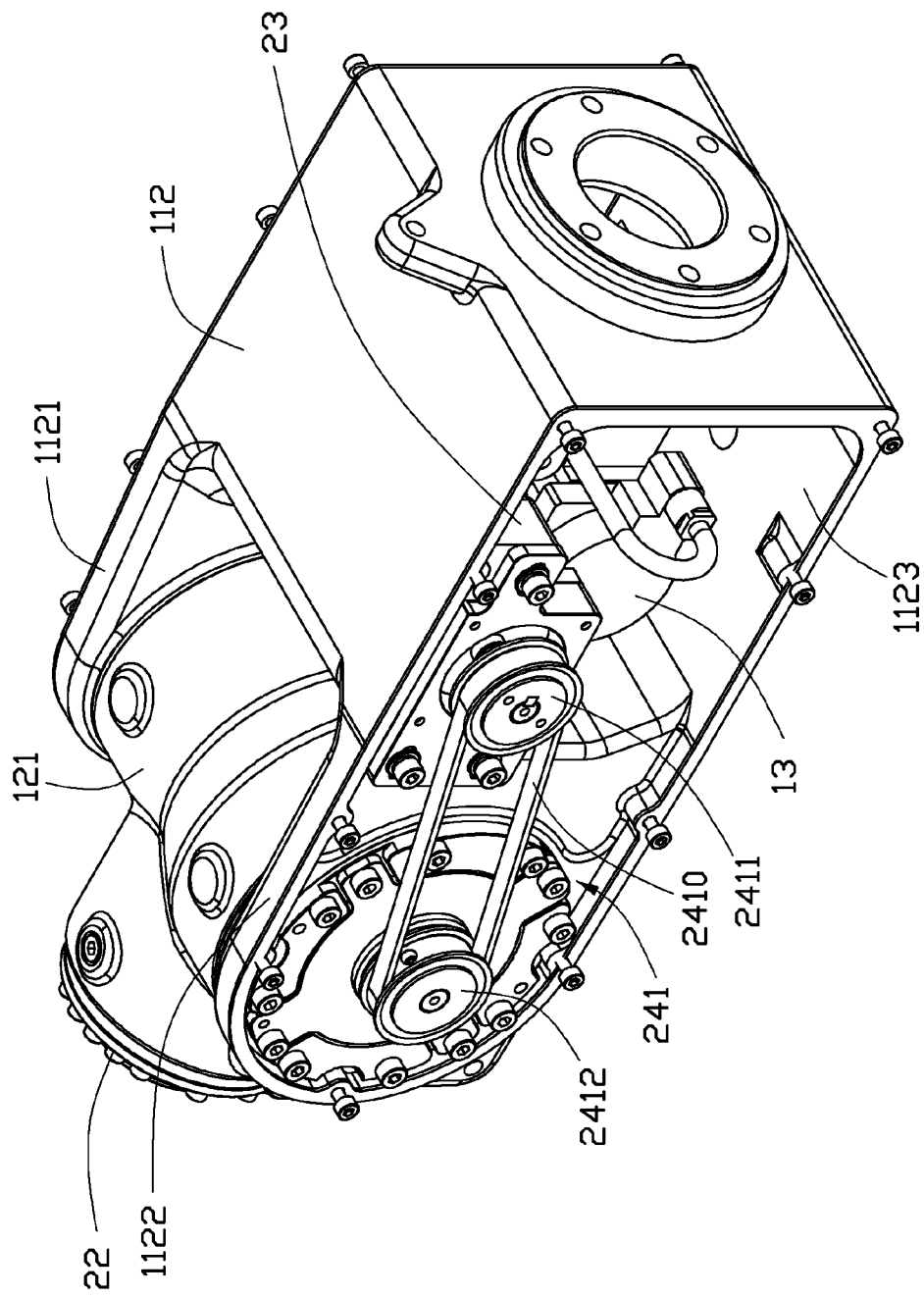
FIG. 3 is similar to FIG. 2, but viewed from another aspect omitting a second housing thereof.
Figure 4:
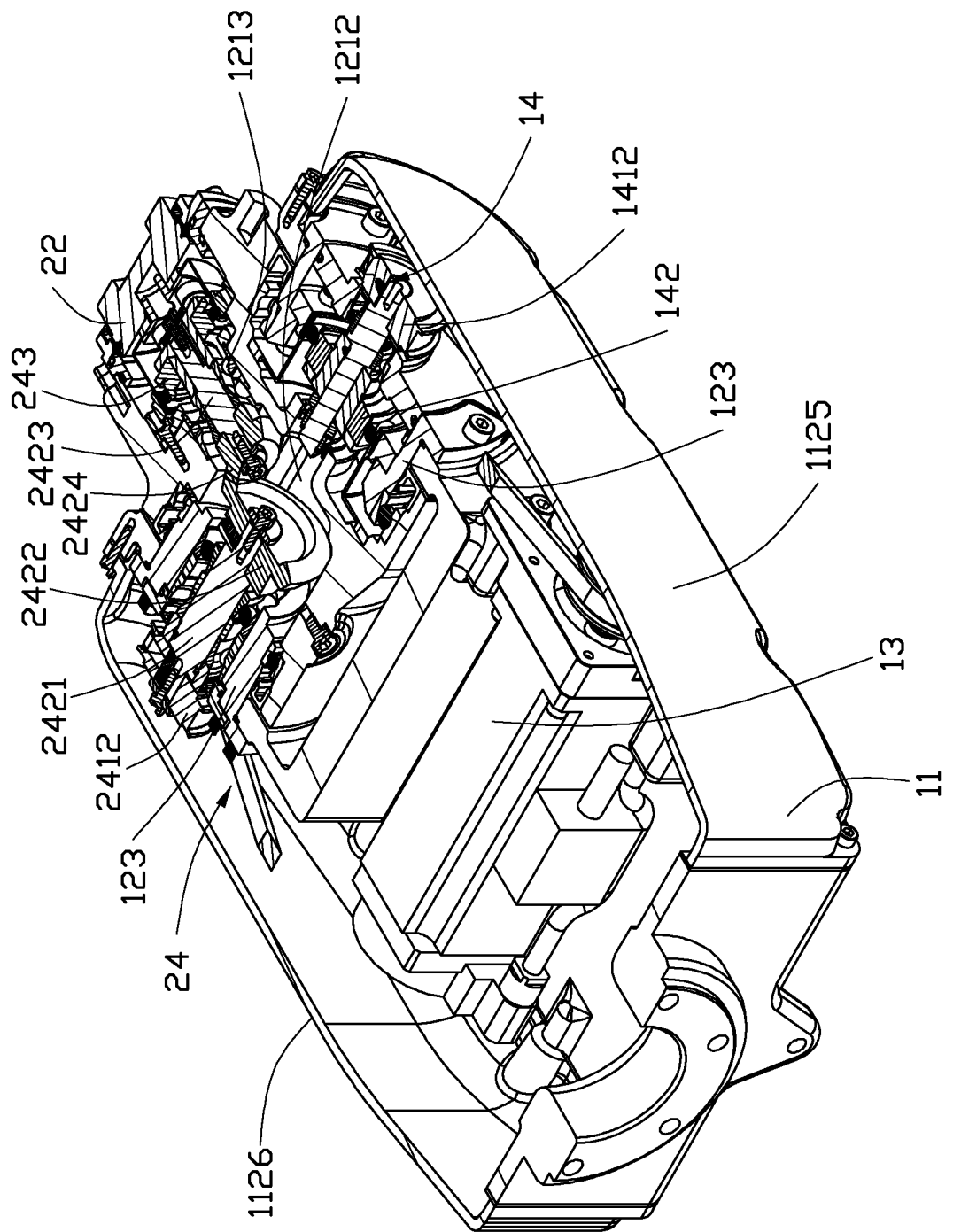
FIG. 4 is a cross section of the robot arm assembly of FIG. 1.

Referring to FIGS. 1 through 4, one embodiment of a robot arm assembly 100 according to the disclosure includes a support arm 11, a lower arm 12 rotatably connected to an front end of the support arm 11, a first driver 13 for driving the lower arm 12, a first transmission 14 between the first driver 13 and the lower arm 12 for transferring power from the first driver 13 to the lower arm 12, an upper arm 22 rotatably connected to the lower arm 12, a second driver 23 for driving the upper arm 22, and a second transmission 24 between the second driver 23 and the upper arm 22 for transferring power from the second driver 23 to the upper arm 22.

In one embodiment, the robot arm assembly 100 is used with a six-axis robot, with the upper arm 22 positioned on a distal end thereof. The support arm 11, the lower arm 12, and the upper arm 22 are rotatable about a first axis A, a second axis B, and a third axis C of the six-axis robot, respectively. The second axis B is substantially perpendicular to the first and third axes A and C. An end effector, such as a welding device, a gripper or a cutting tool, may be mounted at a distal end of the upper arm 22.

The support arm 11 is a two pronged fork and includes a main body 112, a first prong 1121, and a second prong 1122 substantially parallel to the first prong 1121. The main body 112 defines a hollow portion 1123. The first and second prongs 1121 and 1122 extend from an end of the main body 112 along the first axis A, and cooperatively define a receiving portion 1124 therebetween. The lower arm 12 is received in the receiving portion 1124.

The first and second drivers 13 and 23 are received in the hollow portion 1123 of the support arm 11, thus the weight of the upper arm 22 can be reduced utilizing the precise control of the upper arm 22. In addition, since the second driver 23 is received in the lower arm 11, a plurality of cables or wires, such as the signal wires and the power cables, can be connected to the second driver 23 without passing through the lower arm 12, thus protecting the cables or wires from being damaged by abrasion between the cables or wires and the lower arm 12.

In one embodiment, the first and second drivers 13 and 23 are servo motors. The first driver 13 is adjacent to the second driver 23, and output shafts of the first and second drivers 13 and 23 are substantially parallel, thus the robot arm assembly 100 can achieve a more compact size.

The lower arm 12 includes a rotating base 121 and two support rings 123 mounted on two ends of the rotating base 121, respectively. The support rings 123 are fixed in the first and second prongs 1121, 1122, respectively. A roll bearing (not labeled) is positioned between the support ring 123 and the rotating base 121, thus the two ends of the rotating base 121 can smoothly rotate relative to the first and second prongs 1121 and 1122.

The rotating base 121 is substantially cylindrical, and defines a first shaft hole 1212 extending along the second axis B and a second shaft hole 1213 extending along the third axis C. The first shaft hole 1212 is substantially perpendicular to and communicates with the second shaft hole 1213. The upper arm 22 is rotatably received in the second shaft hole 1213.

The first transmission 14 includes a first belt assembly 141 and a first speed reducer 142 coupled to the belt assembly 141.

The first belt assembly 141 includes a first synchronous belt 1410, a first input pulley 1411, and a first output pulley 1412. The first input pulley 1411 is coupled to the first driver 13, the first output pulley 1412 rotates the first speed reducer 142, and the first speed reducer 142 is coupled to the rotating base 121 of the lower arm 12, in such a manner that the first transmission 14 transfers power from the first driver 13 to the lower arm 12. In one embodiment, the first speed reducer 142 is a harmonic driver reducer, so that a large reducer ratio and a compact size can be achieved.

The second transmission 24 includes a second belt assembly 241, a beveled gear assembly 242 driven by the second belt assembly 241, and a second speed reducer 243.

The second belt assembly 241 includes a second synchronous belt 2410, a second input pulley 2411, and a second output pulley 2412. The second input pulley 2411 is coupled to the second driver 23, and the output pulley 2412 rotates the beveled gear assembly 242.

The first belt assembly 141 is positioned on a side of the support arm 11 where the first prong 1121 is formed, and the second belt assembly 241 is positioned on a side where the second prong 1122 is formed. Because the first and second belt assemblies 141 and 241 are located on opposite sides of the support arm 11, the robot arm assembly 100 can achieve a more compact size and can be assembled easily. Furthermore, the first and second prongs 1121 and 1122 can be fixed to a first housing 1125 and a second housing 1126, respectively, thus the first and second transmissions 14 and 24 are enclosed in the support arm 11.

The beveled gear assembly 242 includes a first shaft 2421, a first beveled gear 2422, a second shaft 2423, and a second beveled gear 2424 engaging with the first beveled gear 2422. The output pulley 2412 and the first beveled gear 2422 are fixed to two ends of the first shaft 2422. The second beveled gear 2424 and the second speed reducer 243 are fixed to two ends of the second shaft 2423. The first shaft 2412 is received in the support ring 123, and supported by a roll bearing received in the support ring 123. The second shaft 2423 is received in the second shaft hole 1213 and supported by a roll bearing received in the second shaft hole 1213. An input shaft of the second reducer 243 is coupled to the second beveled gear 2423, and an output shaft of the second reducer 243 is coupled to the upper arm 22. In such a manner, the second transmission 24 transfers power from the second driver 23 to the upper arm 22. In one embodiment, the second speed reducer 142 is a harmonic driver reducer, thus the robot arm assembly 100 can achieve a more compact size and be lightened.

It should also be understood that the robot arm assembly 100 described is not limited to a six-axis robot, and can be used in robots with fewer axes.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly comprising:
   a support arm;
   a lower arm rotatably connected to the support arm, the lower arm comprising a rotating base and two support rings mounted on two ends of the rotating base and received in the rotating base, respectively;
   an upper arm rotatably connected to the rotating base of the lower arm;
   a first driver for driving the lower arm;
   a first transmission partly received in one of the two support rings, and transferring power from the first driver to the rotating base of the lower arm;
   a second driver driving the upper arm, the second driver positioned on the first driver, and parallel to the first driver; and
   a second transmission transferring power from the second driver to the upper arm, wherein the first and second drivers are mounted on the support arm, and the second transmission comprises a belt assembly, a beveled gear assembly driven by the belt assembly, and a speed reducer coupled to the upper arm, the beveled gear assembly partly received in the other one of the two support rings.

2. The robot arm assembly of claim 1, wherein the first driver and the second driver are adjacent to each other, and an output shaft of the first driver and an output shaft of the second driver are substantially parallel.

3. The robot arm assembly of claim 1, wherein the support arm comprises a main body defining a hollow portion, and the first driver and the second driver are received in the hollow portion.

4. The robot arm assembly of claim 3, wherein the support arm further comprises two substantially parallel prongs extending from an end of the main body and defines a receiving portion therebetween, and the lower arm is received in the receiving portion.

5. The robot arm assembly of claim 4, wherein the first transmission comprises a belt assembly and a speed reducer driven by the belt assembly and coupled to the lower arm.

6. The robot arm assembly of claim 5, wherein the belt assembly of the first transmission comprises a synchronous belt, an input pulley coupled to the first drive, and an output pulley coupled to the speed reducer of the first transmission.

7. The robot arm assembly of claim 6, wherein the belt assembly of the second transmission comprises a synchronous belt, an input pulley coupled to the second driver, and an output pulley coupled to the speed reducer of the second transmission.

8. The robot arm assembly of claim 7, wherein the speed reducer of the first transmission and the speed reducer of the second transmission are harmonic driver reducers.

9. The robot arm assembly of claim 5, wherein the belt assembly of the first transmission and the belt assembly of the second transmission are positioned on opposite sides of the support arm.

10. The robot arm assembly of claim 5, wherein the beveled gear assembly comprises a first shaft coupled to the belt assembly of the first transmission, the first shaft is received in the corresponding one of the two support rings, and supported by a roll bearing received in the support ring, a first beveled gear mounted on the first shaft, a second shaft coupled to the upper arm, and a second beveled gear mounted on the second shaft engaging with the first beveled gear.

11. The robot arm assembly of claim 10, wherein opposite ends of the rotating base are rotatably connected to the two substantially parallel prongs, respectively.

12. The robot arm assembly of claim 11, wherein the rotating base defines a first shaft hole and a second shaft hole, the first shaft hole is substantially perpendicular to and communicates with the second shaft hole, the first shaft is rotatably received in the first shaft hole, and the second shaft is rotatably received in the second shaft hole.

13. A robot arm assembly used with a six-axis robot, the robot arm assembly comprising:
   a support arm;
   a lower arm rotatably connected to the support arm and positioned in an distal end of the six-axis robot, the lower arm comprising a rotating base and two support rings mounted on two ends of the rotating base and received in the rotating base, respectively;
   an upper arm rotatably connected to the rotating base of the lower arm;
   a first driver for driving the lower arm;
   a first transmission partly received in one of the two support rings, and transferring power from the first driver to the rotating base of the lower arm, the first transmission comprising a first belt assembly and a first speed reducer driven by the first belt assembly and coupled to the lower arm;
   a second driver for driving the upper arm, the second driver positioned on the first driver, and parallel to the first driver; and
   a second transmission between the second driver and the upper arm for transferring power from the second driver to the upper arm, wherein the first driver and the second driver are mounted on the support arm, and the second transmission comprises a second belt assembly, a beveled gear assembly driven by the second belt assembly, and a second speed reducer coupled to the upper arm, the beveled gear assembly partly received in the other one of the two support rings.

* * * * *